United States Patent [19]

Lutz

[11] 4,044,159
[45] Aug. 23, 1977

[54] EXTRUDED CEREAL PRODUCT AND ITS PREPARATION

[75] Inventor: Roger J. Lutz, Fremont, Mich.

[73] Assignee: Gerber Products Company, Fremont, Mich.

[21] Appl. No.: 398,032

[22] Filed: Sept. 17, 1973

Related U.S. Application Data

[63] Continuation of Ser. No. 185,871, Oct. 1, 1971, abandoned.

[51] Int. Cl.² .............................................. A23L 1/164
[52] U.S. Cl. ....................................... 426/302; 426/96; 426/449; 426/457
[58] Field of Search .................. 426/89, 297, 96, 310, 426/142, 302, 621, 449, 658, 457, 659, 635, 457, 516, 518, 464, ; 264/176 R

[56] References Cited

U.S. PATENT DOCUMENTS

| 1,321,754 | 11/1919 | Kellogg | 99/81 |
| 2,339,419 | 1/1944 | McKay | 99/81 |
| 2,540,302 | 2/1951 | Stecher | 99/83 |
| 2,552,290 | 5/1951 | Lilly | 99/81 |
| 2,607,691 | 8/1952 | Bettman | 99/83 |
| 2,868,647 | 1/1959 | Vollink | 99/83 |
| 3,054,677 | 9/1962 | Graham | 99/81 |
| 3,094,947 | 6/1963 | Green | 99/83 |
| 3,454,403 | 7/1969 | Maxwell | 99/81 |

*Primary Examiner*—Thomas G. Wyse
*Assistant Examiner*—Ernest G. Therkorn
*Attorney, Agent, or Firm*—Townsend and Townsend

[57] ABSTRACT

A ready-to-eat, protein rich, cereal product prepared by cooking a moist, free flowing blend, extruding the cooked blend with a generally uniform cross-section and slicing the extruded blend into thin flakes. A sugar composition, containing those vitamins such as thiamine and lysine that are destroyed by high temperature, is useful as a coating for the extruded product.

4 Claims, No Drawings

EXTRUDED CEREAL PRODUCT AND ITS PREPARATION

This is a continuation of application Ser. No. 185,871, filed Oct. 1, 1971, now abandoned.

This invention relates to a protein-rich, nutritional product prepared from a thick aqueous cereal suspension through cooking and forming by extrusion. More particularly, the invention resides in the employment of a screw-type extruder having an artistically-shaped die to provide a uniquely-shaped extrusion product of substantially uniform cross-section and thereafter slicing the extruded material into thin flakes so as to provide a finished product especially suitable for use as a nutritious and appetizing infant food.

Conventional drum drying involves the application of a liquid material in the form of a solution or slurry to a revolving heated metal drum that conducts heat to the wet material during a partial revolution of the drum to reduce the water content thereof by evaporation. The dried material is thereafter scraped from the surface of the drum by a stationary knife (doctor blade) spaced around the drum periphery from the point of application by an arcuate distance corresponding to that desired to allow for drying. In this manner, the product is exposed to heat during the brief time required for the drum to rotate around this arc between the point of application and the fixed location of the knife.

In the fluid cereal slurry industry, the drying is usually accomplished with atmospheric double drum dryers, i.e., a pair of closely spaced cylindrical drying surfaces that are heated internally such as by steam. Drums are conventionally employed that have the same radius and are in parallel alignment with their axes of rotation on the same level.

The cereal slurry to be dried is disposed as a "puddle" or pool in the space (trough) formed between the upper adjacent surfaces of the two drums. The puddle, normally in direct contact with the upper adjacent surfaces of both drums, provides a thin film that is deposited on the drums as they rotate downwardly toward the nip formed between their adjacent outer surfaces. Drying of the film continues throughout the aforementioned arcuate interval while the sheet is in contact with the heated drum surface prior to being scraped from each drum by respective stationary blades. Flaking is either accomplished simultaneously with the scraping or is produced subsequently with separate apparatus.

Present practice in the cereal drying industry involves the use of a relatively thin cereal slurry, i.e., a slurry having a solids content usually no greater than about 14 percent by total weight. The reason for this is that when the cereal slurry solids content is increased above about 14 percent, the slurry viscosity also increases proportionally with the result that cushions or pockets of steam form between the layer of slurry and the hot surface of the drum dryer. Thereafter, as the aqueous content of the slurry vaporizes, the pockets of air are not released but remain entrapped between the cereal layer and the drum surface. For this reason, the film of cereal slurry that is formed on the dryer roll is neither continuous nor uniform.

The resulting dried end product is found to be lacy and thin and not reduced to the required bulk density. Furthermore, the lack of continuous contact between the heated drum dryer surface and the cereal slurry decreases the efficiency of the heat-transfer therebetween. As a result, the anticipated increase in production rate has not been found to be accomplished when solids content has been increased significantly above 14 percent. Thus, the cereal industry is presently limited to the treatment of slurries having the aforementioned low, solids concentrations.

It has now been found that a moist, free flowing blend of cereal having an extremely high solid content, i.e., in the range of 70 percent to 88 percent solids and more, can be processed through utilization of extrusion as the principal method for both mixing and shaping the moist blend into a continuous "rope" of generally uniform cross-section. This rope is then sliced into increments of a thickness corresponding to flakes heretofore formed by drum drying practices, i.e., from about 0.001 to about 0.2 inches. The uniformity of thickness obtainable with the instant process results in a product having highly consistent characteristics. Thereafter, the low moisture containing flake need only be subjected to a minimum amount of additional drying to reduce the ultimate water content to that commercially acceptable for the end product. The resulting dried flakes exhibit a repetitive appearance and uniform texture and are useful as a cold cereal for consumption with milk as well as a snack-type food for both small children and adults.

In a preferred embodiment of this invention, the dry components of the cereal composition are preliminarily blended, mixed with the prescribed amount of water, and thereafter subjected to gradual advancement through a screw-type heated extruder. In this manner, the extruder not only uniformly disperses the blended materials in the liquid but provides uniform cooking of the resulting thick paste. By employing an extruder having a die with an ornate or artistic opening and utilizing a cutting device mounted thereon for dividing the extruded composition into flakes of desired thickness, the generally repetitive appearance of the ultimate dried product has been found to be particularly palatable to the consumer.

In another embodiment, the extruded and sliced product, still damp in texture can be coated with a layer of a sugar-rich composition. When the moisture content is subsequently adjusted by drying, the coating has been found to uniformly adhere to the product. Other ingredients such as vitamins, minerals and the like can also be incorporated with the coating to enhance the nutritional value of the extruded cereal product.

The dry cereal components utilized in this invention include cereal grains such as oat, rice, barley, wheat, corn, soy, as well as mixtures thereof and special composites such as hi-protein formulas. Additional ingredients can include calcium phosphate, calcium cascinate, as well as various conventional minerals, vitamins and seasonings.

The process of this invention is most advantageously accomplished in the following manner. First the dry ingredients are blended and water is then added to adjust the moisture content to 12–30 percent by weight. The resulting wet blend is cooked at a temperature of 230°–310° F and thereafter the cooked, slightly wet blend is extruded as a continuous "rope" having an appropriate diameter which is then sliced into pellets, i.e., short segments of the ribbon. These segments are then further divided into portions having a thickness of about 0.01 to 0.2 inch and the moisture content reduced to the prescribed level.

Turning now to various steps of the process in greater detail, it has been found advantageous to conduct the preliminary blending of the dry ingredients in equipment such as a conventional ribbon-type blender. By incorporating the water in the blender simultaneously therewith, a degree of preliminary mixing is accomplished prior to transfer of the ingredients to the extruder. It has been found to be particularly advantageous to utilize a screw-type extruder having a plurality of jacketed zones that can be either heated (or cooled) individually. Furthermore, added advantages have been found to be provided when the extruder screw is cored (or hollow) so that additional heating (or cooling) may be accomplished.

The extruder is advantageously equipped with a cutting device, pressure-sensing gauge and a thermocouple. In addition, an adapter can be provided at the end of the extruder to allow for the attachment of dies having various configurations of openings. The pressure gauge and thermocouple are placed immediately preceding the die so that the processing pressure and temperature can be readily ascertained. The aforementioned compartmented zones provide heat to the product by conduction and further heat is imputed to the product by the friction developed with the rotating screw. The heat imputed from the extruder surfaces to the product accomplishes the desired cooking.

Although any configuration of shaped opening can be provided in the extruder die, it has been found to be particularly advantageous for the die to enable the production of an extruded product having a star-shaped configuration. Openings ranging in their largest dimension from about 1/16 to about ¼ inch are useful, as the extruded product has been found to expand by a factor of about 3 upon release from the die.

The extruder is advantageously provided with a cutter blade for attachment and controlled periodic rotation along the outer surface of the extruder head to cut the extruded material into short segments as it leaves the extruder. It is preferable for the segments of extruded product to be of a length suitable for feeding to an Urschel mill that is fitted with a further slicing head. Such segments, that are conveniently formed in a length of from ⅛ inch to ¼ inch, are then sliced to a thickness of about 0.005 inches or greater depending upon the particular type of product desired. It will be apparent to one skilled in this art that alternatively, the finely-divided flakes can also be formed by a single operation as the thick paste is released from the extruder opening.

Additional moisture reduction to provide a commercially dry product can thereafter be accomplished with any of the drying equipment conventionally available. Such devices can include surface combustion batch tray suspended dryers that operate at about 300° F. When used in describing the product of this invention, the term "commercially dry" is intended to include cereal products having a moisture content of about 5 percent by total weight or less.

To further illustrate the invention, the following example is provided. It should be understood that the particular details of the example are not to be regarded as limitations as they may be varied as will be understood by one skilled in this art.

EXAMPLE

The following components were mixed in a ribbon blender:

| Component | Quantity (Pounds) |
| --- | --- |
| Out Floor | 100 |
| Calcium Phosphate | 2.13 |
| Iodized Salt | 1.20 |
| Sugar | 5.00 |

The moisture content was adjusted to 19.5% by the addition of 26.25 pounds of water. The moist, free flowing blend was metered at a uniform rate to an extruder having 4 jacketed heating zones and manufactured by the Bonnot Company of Canton, Ohio. The extruder was equipped with a 10 horsepower variable drive motor having a screw speed range of approximately 70 to 235 rpm. Steam introduction into the heating zones was sufficient to raise the temperature of the moist blend to about 300° F as it reached that end of the extruder containing the die head. The die head had openings of about ⅛ inch in diameter. The moist blend was forced out of the die under a pressure of 600 pounds per square inch gauge and cut into lengths of about ¼ inch. The extruded particles were found to have expanded, on an average, to about ⅜ inch in diameter. The extruded particles were conveyed to an Urschel mill and sliced into flakes about 0.015 inches in thickness. The resulting flakes were transferred to a batch dryer operated at 280° F and the moisture content reduced to about 5 percent.

Although the foregoing invention has been described in some detail by way of illustration and example for purposes of clarity of understanding, it will be appreciated that certain changes and modifications may be practiced within the scope of the invention as limited only by the scope of the appended claims.

What is claimed is:

1. A process for preparing a nutritional, ready-to-eat expanded cereal product in the form of thin flakes, especially suitable for the feeding of junior-age infants, from a moist, free flowing blend formed of dry ingredients including cereal grain, consisting essentially of the steps of: blending the dry ingredients with from 12 to 30% by total weight of water; providing an extruder having a diehead opening in the range of 1/16 to ¼ inch; cooking said blended ingredients at a temperature of about 300° F while simultaneously extruding the same from said diehead opening under sufficient pressure to provide a product form expanded by a factor of about 3; slicing said expanded form into flakes of a thickness of about 0.005 to 0.2 inches; and drying said flakes at a temperature of about 300° F to a moisture content of less than about 5% by total weight.

2. A process in accordance with claim 1 wherein said cereal is selected from oat, rice, barley, wheat, corn and soy.

3. A process in accordance with claim 2 and further characterized by coating said divided flakes with a sugar syrup prior to said drying.

4. A process in accordance with claim 1 wherein the extrusion pressure is 600 pounds per square inch gauge.

* * * * *